(12) United States Patent
Maier et al.

(10) Patent No.: US 10,189,938 B2
(45) Date of Patent: Jan. 29, 2019

(54) POLYUREA COMPOSITION

(71) Applicant: SIKA TECHNOLOGY AG, Baar (CH)

(72) Inventors: Steffen Maier, Wettingen (CH); Dominik Huber, Winterthur (CH); Steffen Kelch, Oberengstringen (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/518,057

(22) PCT Filed: Oct. 13, 2015

(86) PCT No.: PCT/EP2015/073726
§ 371 (c)(1),
(2) Date: Apr. 10, 2017

(87) PCT Pub. No.: WO2016/059083
PCT Pub. Date: Apr. 21, 2016

(65) Prior Publication Data
US 2017/0240686 A1    Aug. 24, 2017

(30) Foreign Application Priority Data

Oct. 13, 2014    (EP) .................................... 14188626

(51) Int. Cl.
*C08G 18/50*    (2006.01)
*C08G 18/48*    (2006.01)
(Continued)

(52) U.S. Cl.
CPC .......... *C08G 18/5027* (2013.01); *B29C 73/02* (2013.01); *C08G 18/10* (2013.01); *C08G 18/12* (2013.01); *C08G 18/324* (2013.01); *C08G 18/482* (2013.01); *C08G 18/4854* (2013.01); *C08G 18/5024* (2013.01); *C08G 18/6681* (2013.01); *C08G 18/73* (2013.01);
(Continued)

(58) Field of Classification Search
CPC .................................................. C08G 18/5027
See application file for complete search history.

(56) References Cited

U.S. PATENT DOCUMENTS 5,039,775 A * 8/1991 Oyaizu .............. C08G 18/3243
528/60
2002/0091222 A1    7/2002 Viegas et al.
2012/0035001 A1    2/2012 Xie

OTHER PUBLICATIONS

Jan. 27, 2016 International Search Report issued in Patent Application No. PCT/EP2015/073726.
(Continued)

*Primary Examiner* — Daniel H Lee
(74) *Attorney, Agent, or Firm* — Oliff PLC

(57) ABSTRACT

The invention relates to compositions comprising at least one first and one second component; —the first component K1 comprising at least one di(aminobenzoate) ester A1 of formula (I) with an average molecular weight of 500 g/mol to 2000 g/mol, preferably 600 g/mol to 1500 g/mol and particularly preferred between 650 g/mol and 1300 g/mol, G being a divalent group derived from poly(tetramethylene oxide) diol, and —the second component K2 comprising at least one aromatic polyisocyanate B1 with an average molecular weight of 160 g/mol to 1100 g/mol, preferably 500 g/mol to 800 g/mol.

20 Claims, 2 Drawing Sheets

(51) Int. Cl.
- *C08G 18/66* (2006.01)
- *C08G 18/76* (2006.01)
- *C08G 18/79* (2006.01)
- *C08G 18/12* (2006.01)
- *C08G 18/32* (2006.01)
- *C09J 175/02* (2006.01)
- *B29C 73/02* (2006.01)
- *C08G 18/10* (2006.01)
- *C08G 18/73* (2006.01)
- *C09J 5/00* (2006.01)
- *B29K 75/00* (2006.01)

(52) U.S. Cl.
CPC ....... *C08G 18/7664* (2013.01); *C08G 18/797* (2013.01); *C09J 5/00* (2013.01); *C09J 175/02* (2013.01); *B29K 2075/02* (2013.01); *C09J 2400/226* (2013.01)

(56) References Cited

OTHER PUBLICATIONS

Apr. 18, 2017 International Preliminary Report on Patentability issued Patent Application No. PCT/EP2015/073726.
Jun. 1, 2018 Office Action issued in Chilean Patent Application No. 201700926.

\* cited by examiner

POLYUREA COMPOSITION

TECHNICAL FIELD

The invention relates to the field of polyurea compositions and to their use, especially as adhesive, as coating or filling compound on substrates composed of elastomeric materials comprising unsaturated units.

The present invention further relates to a method of patching defects such as cracks or holes in said elastomeric materials and adhering together such substrates, preferably without chemical or physical pretreatment of the substrates, and also to a method of using said composition to bond and patch these elastomeric materials, especially in the context of repairing conveyor belts.

RELATED ART

Conveyor belt systems are currently the best-performing means for transporting solid materials in the mining industry.

The conveyor belt is that element of such conveyor systems which comes into direct contact with the material to be transported. It normally consists of a multilayered element which may be reinforced with different materials. The surface layer generally consists of elastomeric material comprising unsaturated units. In addition, depending on the particular application, other materials, such as polymers or steel, may also be employed. There are various conveyor belt types for wet and dry materials, coarsely and finely divided materials or solids differing in hardness.

Conveyor belts are subject to high wear and tear in use, so repairs of cracks or other damage are a frequent necessity. However, many of the repair systems currently available on the market, which are based on polyurethanes, have the disadvantage that they are but relatively slow to cure or insufficiently keen to form a bond with the material of the conveyor belt. A possible consequence is that conveyor belt systems to be repaired have to be idled for a relatively long time, entailing appreciable costs because transportation has to be interrupted for this period. There is accordingly a need for conveyor belt repair and bonding systems which are quick to apply and similarly quick to build adherence and cure in order that idling time may be minimized for conveyor belts.

Said elastomeric substrates composed of materials comprising unsaturated units, for example EPDM (ethylene-propylene-diene monomer copolymer), NBR (acrylonitrile-butadiene rubber) or SBR (styrene-butadiene rubber), are generally not very amenable to any form of processing with adhesives, sealants or filling compounds. Especially the joining or adhesive bonding of such substrates is fraught with great difficulties, since conventional adhesives are but insufficiently adherent to such substrates. Adherence requirements are particularly high with substrates being worked dynamically, as in the case of a change of direction roller in conveyor belts, or exposed to vibrations, sudden deformations or impacts.

There is accordingly a need for compositions and methods whereby substrates comprising or consisting of materials having unsaturated double bonds such as EPDM, NBR or SBR may be adhered together or repaired while at the same time achieving effective bonding of the substrate to the adhesives, especially without employing a pretreatment for the substrate.

The composition preferably has the following mechanical properties:

tensile strength: 6-40 MPa
breaking extension: 100-800%, especially 200-800%
E-modulus (0.05-0.25%): 8-110 MPa
breaking energy: 0.1-1.3 J/mm$^2$
gel time: 10-60 min, preferably 10-30 min There is more particularly a desire for compositions which combine a high level of tensile strength for the adhesive bond and yet a high level of extensibility across a very large temperature range with a very low temperature dependence of the strength. There is further a desire for compositions which have good adherence to substrates comprising elastomeric material comprising unsaturated units, especially when such substrates are being worked dynamically.

SUMMARY OF THE INVENTION

The problem addressed by the present invention is therefore that of providing a polyurea composition which has a high level of strength and extensibility coupled with a but minimal temperature dependence of the mechanical properties and has good adherence properties to substrates comprising elastomeric material comprising unsaturated units, especially when such substrates are being worked dynamically.

This problem is surprisingly solved by the composition according to the present invention.

Further independent claims relate to further aspects of the invention. Dependent claims relate to particularly preferred embodiments of the invention.

WAYS TO CARRY OUT THE INVENTION

Figure 1:
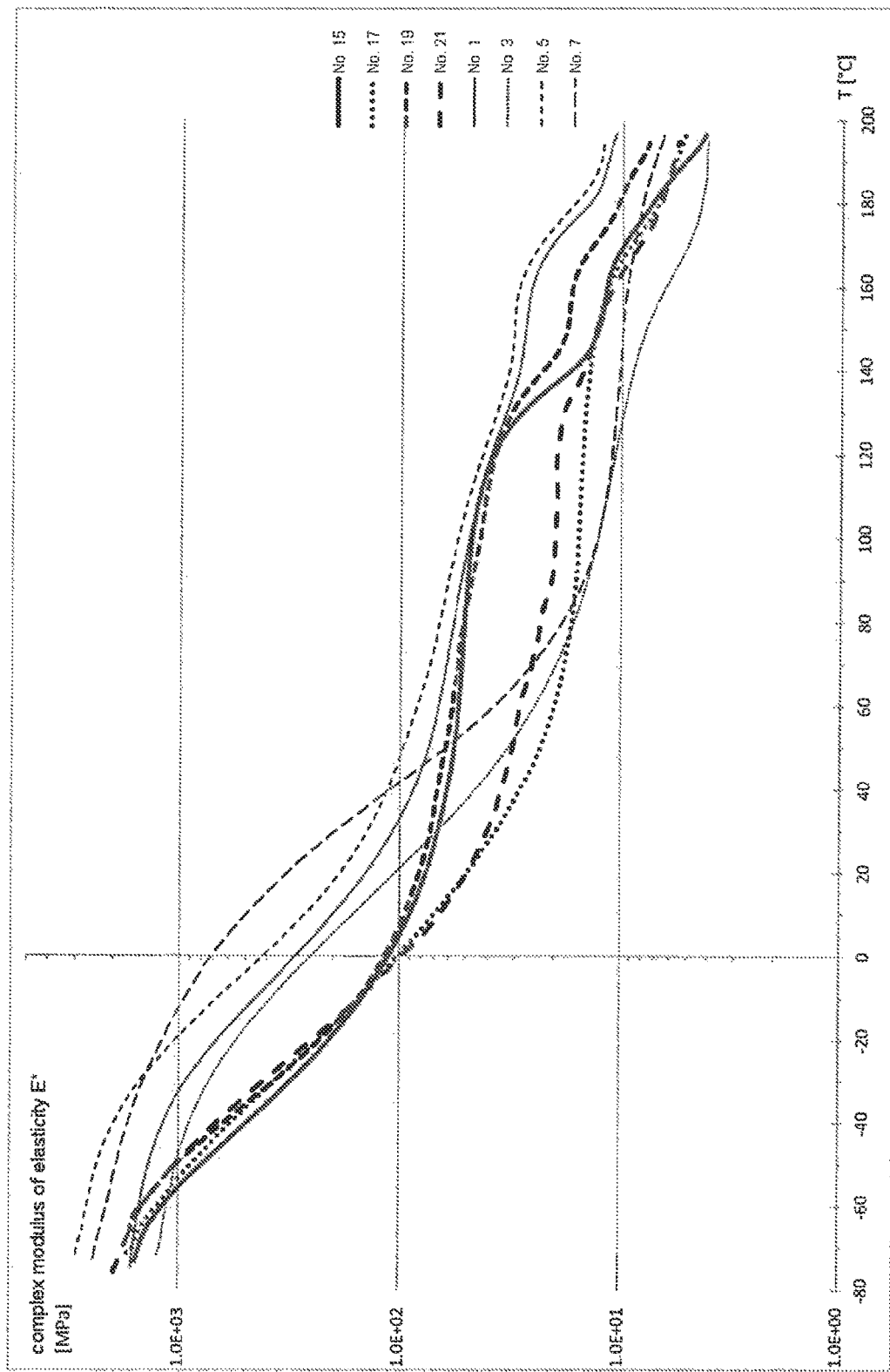
FIGS. 1 and 2 are graphs showing complex modulus of elasticity E* and loss angle "tan δ" data, respectively, for various exemplified polyurea compositions.

The present invention provides a composition comprising, at least, a first component and a second component, wherein
the first component K1 comprises
one or more than one di(aminobenzoate) ester A1 of formula (I)

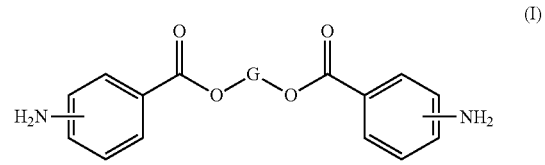

with an average molecular weight of 500 g/mol to 2000 g/mol, preferably 600 g/mol to 1500 g/mol, more preferably 650 g/mol to 1300 g/mol, where G is a divalent moiety deriving from poly(tetra-methylene oxide) diol, and
the second component K2 comprises
one or more than one aromatic polyisocyanate B1 with an average molecular weight of 160 g/mol to 1100 g/mol, preferably 500 g/mol to 800 g/mol,
wherein the molar ratio between the isocyanate groups of the second component K2 and the isocyanate-reactive groups of the first component K1 is in the range from 1.3 to 1.0, preferably 1.15 to 1.05.

The prefix "poly" in substance designations like "polyol", "poly-isocyanate", "polyether", "polyurea" or "polyamine" herein indicates that the particular substance formally contains per molecule more than one of the functional group appearing in its designation.

"Molecular weight" herein is to be understood as meaning the molar mass (in grams per mole) of a molecule. "Average molecular weight" refers to the number average molecular weight $M_n$ of an oligomeric or polymeric mixture of molecules, which is typically determined via GPC against polystyrene as standard.

"Primary hydroxyl group" refers to an OH group attached to a carbon atom having two hydrogens.

"Open time" herein designates the time within which the adherend parts have to have been joined once the components are mixed.

The term "strength" herein designates the strength of the cured composition, which strength is to be understood as meaning especially the tensile strength and the modulus of elasticity (E-modulus), especially in the 0.05 to 0.25% extension range.

"Room temperature" herein designates a temperature of 23° C.

The term "polyurethane polymer" comprehends all polymers obtained via the so-called diisocyanate polyaddition method. The term "polyurethane polymer" also comprehends isocyanate-functional polyurethane polymers as obtainable from the reaction between the polyisocyanates and polyols and as are themselves polyisocyanates and are often also called prepolymers.

"Glass transition temperature" or "Tg" herein designates the glass transition temperature determined via dynamic mechanical thermal analysis (DMTA) as the maximum in the curve for the loss angle "tan δ".

The term "isocyanate-reactive group" herein designates especially hydroxyl, mercapto or primary or secondary amino groups, preferably hydroxyl or primary or secondary amino groups.

The "gel time" herein is determined as follows: 30 g of a ready-mixed composition are determined by the as-mixed mixture being introduced at room temperature into a thermally insulated vessel (made of Styropor), and being thoroughly stirred through manually with a spatula every 60 seconds. The time until it is no longer possible to move the spatula by hand without exerting considerable force is what is defined as the gel time.

The first component K1 of the composition comprises at least one di(aminobenzoate) ester A1 of formula (I)

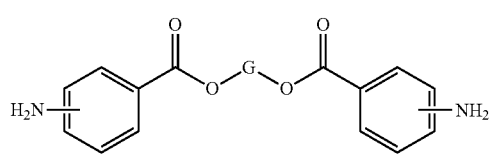

(I)

with an average molecular weight of 500 g/mol to 2000 g/mol, preferably 600 g/mol to 1500 g/mol, more preferably 650 g/mol to 1300 g/mol, where G is a divalent moiety deriving from poly(tetra-methylene oxide) diol.

The G of di(aminobenzoate) ester A1 preferably comprises —$(CH_2$—$CH_2$—$CH_2$—$CH_2$—$O)_n$—, where n is 9-14.

The di(aminobenzoate) ester A1 preferably comprises a compound of formula (II)

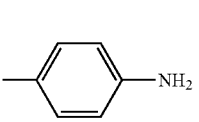

(II)

$H_2N$—⟨⟩—$\overset{O}{\underset{\|}{C}}$—O—$(CH_2$—$CH_2$—$CH_2$—$CH_2$—$O)_n$—O—$\overset{O}{\underset{\|}{C}}$—⟨⟩—$NH_2$ where n is 9-14.

The di(aminobenzoate) esters A1 are obtainable, for example, by the reaction of a nitro-substituted benzoyl halide or of a nitro-substituted benzoic acid with a suitable poly(tetramethylene oxide) diol, followed by the reduction of the nitro groups of the resultant product to form the corresponding amino groups. An advantageous di(aminobenzoate) ester is thus obtainable, for example, by the reaction of two moles of p-nitrobenzoyl chloride with 1 mole of a dihydric alcohol, such as poly(tetramethylene oxide) diol having an average molecular weight in the range from about 230 to about 1730 g/mol and by reducing the resultant poly(tetramethylene oxide) di(p-nitrobenzoate) ester.

The poly(tetramethylene oxide) diol is easily obtainable, for example, by polymerization of tetramethylene oxide in the presence of a compound preferably selected from the list consisting of 1,3-propanediol, 1,4-butanediol and ethylene glycol, especially 1,4-butanediol and ethylene glycol, most preferably 1,4-butanediol.

A suitable poly(tetramethylene oxide) diol preferably comprises ≥90 wt %, especially ≥95 wt %, of a polymerization product of tetramethylene oxide or of a polycondensation product of 1,4-butanediol. Such poly(tetra-methylene oxide) diols are obtainable, for example, by polycondensation, especially acid-catalyzed polycondensation, of 1,4-butanediol or by a ring-opening polymerization of tetramethylene oxide.

Suitable di(aminobenzoate) esters A1 are for example commercially available under the trade designation VERSALINK and is marketed by Air Products and Chemicals, Inc., especially as VERSALINK P 650 and VERSALINK P 1000.

It may further be advantageous for the di(aminobenzoate) ester A1 to comprise a mixture of di(aminobenzoate) esters A1-1 having an average molecular weight of 700-1000 g/mol and di(aminobenzoate) esters A1-2 having an average molecular weight of 1100-1300 g/mol, wherein the mole ratio of A1-1/A1-2 is from 0.01-100, especially from 0.5-2. This is advantageous because the gel time is prolonged as a result.

It may further be advantageous for the di(aminobenzoate) ester A1 to comprise di(aminobenzoate) ester A1-1 having an average molecular weight of 700-1000 g/mol. This is advantageous because higher E-modulus values are obtained as a result.

It may further be advantageous for the di(aminobenzoate) ester A1 to comprise di(aminobenzoate) ester A1-2 having an average molecular weight of 1100-1300 g/mol. This is advantageous because higher values of tensile strength, breaking extension and breaking energy are obtained as a result.

Such di(aminobenzoate) esters A1-2 further lead to a first Tg at low temperatures, especially in the range from −40° C. to −20° C. This is advantageous because the advantageous mechanical properties found are already present at lower temperatures.

Such di(aminobenzoate) esters A1-2 further lead to a temperature range of −20° C. to 40° C., preferably of −20° C. to 50° C., between two successive Tgs, which is advantageous in relation to unchanging mechanical properties, since many industrial applications, especially for conveyor belts, particularly in the mining industry, fall within this temperature range. Such di(aminobenzoate) esters A1-2 are further conducive to better adherence to EPDM.

It may further be advantageous that the first component K1 further comprises an aliphatic, preferably a non-branched, polyetherdiamine A2 with an average molecular weight of 900 g/mol to 2100 g/mol, preferably 1200 g/mol to 1500 g/mol, wherein the polyetherdiamine A2 comprises from 1-15 mole percent, preferably 2-11 mole percent, more preferably 2.5-7 mole percent, of the isocyanate-reactive groups of the first component K1. This is advantageous because, as a result, less has to be used of di(aminobenzoate) ester A1, which typically is higher priced than aliphatic polyetherdiamine A2, yet the composition retains similar mechanical properties, especially in respect of tensile strength and breaking extension.

There is a further advantage in that the flow resistance increases, which may be specifically advantageous in the use of the composition in repairs, preferably as a surfacer in repairs.

The aliphatic polyetherdiamine A2 is typically a polyoxyalkylene diamine, especially selected from the group consisting of polyoxypropylene diamines, polyoxybutylene diamines and polytetramethylene oxide diamine, more preferably from polyoxypropylene diamines and polytetramethylene oxide diamine, most preferably being polytetramethylene oxide diamine.

These are specifically polyoxyalkylene polyamines having two amino groups, for example available under the name Jeffamine® (from Huntsman Chemicals), under the name Polyetheramine (from BASF) or under the name PC Amine® (from Nitroil), and also mixtures of the aforementioned polyamines.

The first component K1 preferably comprises an aforementioned aliphatic polyetherdiamine A2 when the di(aminobenzoate) ester A1 comprises di(aminobenzoate) esters A1-2 having an average molecular weight of 1100-1300 g/mol.

It may further be advantageous that the first component K1 further comprises an aliphatic polyetherdiamine A2 in an amount that the aliphatic polyetherdiamine A2 represent 0-5, preferably 0-3, especially 0-1, more preferably 0-0.1, most preferably 0 mole percent of the number of isocyanate-reactive groups of the first component K1. This is advantageous because as a result the composition has better mechanical properties, especially in respect of a high E-modulus. A further result is that temperature differences between the Tgs of the compositions are larger.

It may further be advantageous that the first component K1 further comprises an aliphatic, preferably a non-branched, polyetherdiol A3, especially poly(tetramethylene oxide) diol, with an average molecular weight of 600 g/mol to 1200 g/mol, preferably 900 g/mol to 1100 g/mol, wherein the polyetherdiol A3 represents 140 mole percent, preferably 2-10 mole percent, particularly preferably 3-7 mole percent, of the isocyanate-reactive groups of the first component K1. This is advantageous because, as a result, the composition acquires a higher breaking extension coupled with a substantially unchanged tensile strength. This is further advantageous for increasing the breaking energy and there may be an increase in the gel time.

The first component K1 preferably further comprises an above-described aliphatic polyetherdiol A3 when the di(aminobenzoate) ester A1 comprises di(aminobenzoate) ester A1-2.

It may further be advantageous that the first component K1 further comprises an above-described aliphatic polyetherdiol A3 in an amount that the aliphatic polyetherdiol A3 represent 0-5, preferably 0-3, especially 0-1, more preferably 0-0.1, most preferably 0 mole percent of the number of isocyanate-reactive groups of the first component K1.

The first component K1 preferably comprises an aliphatic polyether-diol A3 in an aforementioned amount when the di(aminobenzoate) ester A1 comprises di(aminobenzoate) ester A1-2. This is advantageous in that as a result the composition has higher E-modulus values and achieves a shorter gel time.

The molar ratio between the isocyanate groups of the second component K2 and the isocyanate-reactive groups of the first component K1 is in the range from 1.3 to 1.0, preferably 1.15 to 1.05. This is advantageous in that as a result the composition have a higher tensile strength, higher E-modulus values and a shorter gel time. It is further the case that excessively low molar ratios are disadvantageous by reason of excessively high breaking extension values, while excessively high molar ratios are disadvantageous by reason of excessively high E-modulus values (especially E-modulus (0.05-0.25%)).

The composition may additionally contain further isocyanate-reactive substances as a constituent part of the first component K1.

The first component K1 preferably includes less than 3 wt %, preferably 0-2.5 wt %, especially 0-1.8 wt %, more preferably 0-1 wt %, most preferably 0 wt %, based on the total amount of amine compounds in the first component K1, of a polyamine PA having a molecular weight in the range from 60 to 500 g/mol, especially 60 to 400 g/mol. The first component K1 most preferably contains no polyamine PA.

The first component K1 preferably includes less than 17 mol %, preferably 0-15 mol %, especially 0-12 mol %, more preferably 0-10 mol %, most preferably 0 mol %, based on the total amount of amine compounds in the first component K1, of a polyamine PA having a molecular weight in the range from 60 to 500 g/mol, especially 60 to 400 g/mol.

The polyamine PA is preferably an aromatic polyamine, especially an aromatic polyamine selected from the list consisting of m-phenylenediamine, p-phenylenediamine, 4,4'-, 2,4'- and/or 2,2'-diaminodiphenylmethane, 3,3'-dichloro-4,4'-diaminodiphenylmethane (MOCA), 2,4- and/or 2,6-tolylene-diamine, mixtures of 3,5-dimethylthio-2,4- and -2,6-tolylenediamine (available as Ethacuree 300 from Albermarle), mixtures of 3,5-diethyl-2,4- and -2,6-tolylenediamine (DETDA), 3,3',5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5'-dimethyl-4,4'-diaminodiphenylmethane (M-MIPA), 3,3',5, 5'-tetraisopropyl-4,4'-diaminodiphenylmethane (M-DIPA), 4,4'-diaminodiphenyl sulfone (DDS), 4-amino-N-(4-aminophenyl)benzene-sulfonamide, 5,5'-methylenedianthranilic acid, dimethyl (5,5'-methylene-dianthranilate), 1,3-propylene-bis(4-aminobenzoate), 1,4-butylene-bis(4-aminobenzoate), 1,2-bis(2-aminophenylthio)ethane, 2-methylpropyl 4-chloro-3,5-diaminobenzoate and tert-butyl 4-chloro-3,5-diaminobenzoate. The polyamine PA is preferably an aromatic diamine.

This is advantageous in that as a result the composition has a higher open time. This is further conducive to achieving higher breaking extension and a higher E-modulus (0.05-0.25%).

It is further advantageous when the combined total of di(amino-benzoate) ester A1, any polyetherdiamine A2 and any polyetherdiol A3 in the first component K1 comprises 95-100 mol %, preferably 98-100 mol %, more preferably 99-100 mol %, most preferably 100 mol %, of all the isocyanate-reactive groups of the first component K1.

In a preferred composition, the first component K1 contains
50 to 90 wt %, especially 60 to 80 wt %, of the combined total of di(aminobenzoate) ester A1, any polyetherdiamine A2 and any polyetherdiol A3, and
to 50 wt %, especially 20 to 40 wt %, of additives selected from the list consisting of
  fillers, especially carbon blacks, chalks and sheet-silicates, pigments, and
  rheology modifiers, especially amorphous silicas,
and also optionally further constituents.

In a further preferred composition, a first component K1 contains 80 to 100 wt %, especially 90 to 100 wt %, most preferably 98 to 100 wt %, of the combined total of di(aminobenzoate) ester A1, any polyetherdiamine A2 and any polyetherdiol A3, and also optionally further constituents.

The second component K2 of the composition comprises at least one aromatic polyisocyanate B1 having an average molecular weight of 160 g/mol to 1100 g/mol, preferably 300 g/mol to 800 g/mol, most preferably 500 g/mol to 800 g/mol.

Suitable aromatic polyisocyanates are especially monomeric di- or triisocyanates, and also oligomers, polymers and derivatives of monomeric di- or triisocyanates, and also any desired mixtures thereof.

Suitable aromatic monomeric di- or triisocyanates are especially 2,4- and 2,6-tolylene diisocyanate and any desired mixtures of these isomers (TDI), 4,4'-, 2,4'- and 2,2'-diphenylmethane diisocyanate and any desired mixtures of these isomers (MDI), mixtures of MDI and MDI homologs (polymeric MDI or PMDI), 1,3-phenylene diisocyanate and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TOBI), dianisidine diisocyanate (DADI), 1,3,5-tris(isocyanatomethyl)benzene, tris(4-isocyanatophenyl)methane and tris(4-isocyanatophenyl) thiophosphate.

The polyisocyanate B1 preferably has an NCO functionality of 2.0-4, more preferably 2.1-2.4.

It is further advantageous when the aromatic polyisocyanate B1 comprises MDI and/or TDI, preferably MDI.

Preferably, the aromatic polyisocyanate B1 comprises carbodiimides or uretoneimines or urethanes of these polyisocyanates, especially MDI carbodiimides or MDI uretoneimines or MDI urethanes, preferably MDI carbodiimides.

It may further be advantageous when the second component contains 60 to 100 wt %, preferably 80-100 wt %, especially preferably 90-100 wt %, most preferably 98 to 100 wt %, of the aromatic polyisocyanate B1.

It is further advantageous when the aromatic polyisocyanate B1 comprises 95-100 mol %, preferably 98-100 mol %, especially preferably 99-100 mol %, most preferably 100 mol %, of all the isocyanate groups of the second component K2.

Suitable oligomers, polymers and derivatives of the monomeric di- and triisocyanates referred to are more particularly derived from MDI and TDI. Commercially available types thereof are especially suitable, especially TDI oligomers such as Desmodur® IL (from Bayer). Especial suitability further extends to room temperature liquid forms of MDI (so-called "modified MDI"), which represent mixtures of MDI with MDI derivatives, especially MDI carbodiimides or MDI uretoneimines or MDI urethanes, known under trade names such as Desmodur® CD, Desmodur® PF, Desmodur® PC (all from Bayer) or Isonate® M 143 (from Dow), and also mixtures of MDI and MDI homologs (polymeric MDI or PMDI), available under trade names such as Desmodur® VL, Desmodur® VL50, Desmodur® VL R10, Desmodur® VL R20, Desmodur® VH 20 N and Desmodur® VKS 20F (all from Bayer), Isonate® M 309, Voranate® M 229 und Voranate® M 580 (all from Dow) or Lupranat® M 10 R (from BASF). The aforementioned oligomeric polyisocyanates are typically in commercial practice mixtures of substances having different chemical structures and/or degrees of oligomerization. They preferably have an NCO functionality of 2.1 to 4.0.

It is further advantageous when the aromatic polyisocyanate B1 comprises a room temperature liquid form.

Especial preference for use as aromatic polyisocyanate B1 is given to room temperature liquid MDI types, especially mixtures of MDI with MDI derivatives, especially MDI carbodiimides or MDI uretoneimines or MDI urethanes, especially with an NCO functionality of 2.1-2.4. The second component more preferably contains from 60 to 100 wt %, yet more preferably from 80 to 100 wt %, yet still more preferably from 90 to 100 wt % and most preferably from 98 to 100 wt % of said room temperature liquid MDI types.

This aromatic polyisocyanate B1 provides particularly good processing properties and particularly high strengths.

The use of such aromatic polyisocyanates is further advantageous in that, as a result, the composition have a higher tensile strength, higher E-modulus values, higher breaking extension values and a shorter gel time.

Larger temperature intervals between the Tgs of the compositions are further obtained, which is conducive to unchanging mechanical properties, especially across a relatively large temperature range. This is advantageous in combination with di(aminobenzoate) esters A1-2 in particular. A further result is better adherence to rubber, especially to NBR, SBR, EPDM, specifically to NBR.

It is further advantageous when the second component K2 further contains at least one isocyanate-functional polyurethane polymer B2.

The polyurethane polymer B2 comprises with preference 50-95 mass percent, especially 70-90 mass percent, of polyoxyalkylene units, more preferably polyoxyethylene and/or polyoxypropylene units, especially polyoxy-propylene units. Such a polyurethane polymer has a low viscosity and enables the attainment of good extensibility.

The average molecular weight of polyurethane polymer B2 is preferably in the range from 1000 to 20 000 g/mol, more preferably in the range from 2000 to 10 000 g/mol.

The average NCO functionality of polyurethane polymer B2 is preferably in the range from 1.7 to 3, especially from 1.8 to 2.5. The average NCO functionality of polyurethane polymer B2 is more preferably in the range from 2.05 to 2.5.

The free isocyanate group content of polyurethane polymer B2 is preferably in the range from 1 to 10 wt %, more preferably in the range from 1 to 5 wt %.

A suitable isocyanate-functional polyurethane polymer B2 is obtainable from the reaction of at least one polyisocyanate with at least one polyol. This reaction may be effected by reacting the polyol and the polyisocyanate using customary processes, for example at temperatures of 50° C. to 100° C. with or without suitable catalysts, while the polyisocyanate has been dosed such that its isocyanate groups are present in a stoichiometric excess relative to the hydroxyl groups of the polyol. The polyisocyanate will advantageously have been dosed such that an NCO/OH ratio of 1.3 to 5, especially one of 1.5 to 3 is maintained. By "NCO/OH ratio" is meant the ratio of the number of isocyanate groups used to the number of hydroxyl groups used. After all the hydroxyl groups of the polyol have been converted, the polyurethane polymer B2 is preferably left with a free isocyanate group content of 1 to 10 wt %, more preferably of 1 to 5 wt %.

The average molecular weight of polyurethane polymer B2 is preferably 500 g/mol or higher. The average molecular weight of polyurethane polymer B2 is especially in the range from 1000 to 20 000 g/mol and preferably in the range from 2000 to 10 000 g/mol.

The polyol used for preparing a polyurethane polymer B2 is preferably a polyoxyalkylene polyol, a polyester polyol, a polycarbonate polyol or a polyacrylate polyol. Particular preference is given to polyoxyalkylene polyols, especially polyoxybutylene polyols, polyoxypropylene polyols and mixed polyoxyethylene-polyoxypropylene polyols.
The average molecular weight of the polyol for preparing a polyurethane polymer B2 is preferably 500-20 000 g/mol, especially in the range from 1000 to 8000 g/mol.

The polyol for preparing a polyurethane polymer B2 is preferably a diol or a mixture between at least one diol and at least one triol, especially a mixture between at least one diol and at least one triol.

MDI, TDI, IPDI and HDI are preferable for use as polyisocyanate for preparing a polyurethane polymer B2. MDI is particularly preferable. 4,4'- and 2,4'-MDI and any desired mixtures of these isomers are most preferable.

This is advantageous in that as a result the composition have higher breaking extension values, especially when the di(aminobenzoate) ester A1 of the first component K1 comprises di(aminobenzoate) esters A1-1 having an average molecular weight of 700-1000 g/mol.

It may further be advantageous when in that the polyurethane polymer B2 comprises 0.1-5 mol %, especially 0.5-3 mol %, more preferably 2-3 mol %, of all the isocyanate groups of the second component K2.

However, it may further also be advantageous when in that the polyurethane polymer B2 comprises 0-2 mol %, especially 0-1 mol %, more preferably 0-0.2 mol %, most preferably 0 mol %, of all the isocyanate groups of the second component K2. It is thus most preferable for the second component K2 not to contain any polyurethane polymer B2.

This is advantageous in that as a result the composition have higher E-moduli and higher tensile strength values.

A preferred composition contains a second component K2 which contains from 90 to 100 wt %, especially 95 to 100 wt %, of aromatic polyisocyanate B1 and optionally polyurethane polymer B2.

The composition may further contain catalysts to hasten the reaction of hydroxyl groups with isocyanate groups, especially tin, zinc, zirconium and bismuth organometallic catalysts, for example dibutyltin dilaurate, or tertiary amines, amidines or guanidines, for example 1,4-diazabicyclo[2.2.2]octane (DABCO) or 1,8-diazabicyclo[5.4.0]undec-7-ene (DBU). Heat activation is attainable by using phenol or carboxylic acids, especially phenolic or other aromatic carboxylic acids, to block especially the tertiary amines, amidines or guanidines. The reversible formation ensues of a salt or complex which in either case decompose on increasing the temperature.

The combined total of the parts by weight for the first component K1 together with the second component K2 preferably includes less than 1.5 wt %, preferably 0-1 wt %, especially 0-0.2 wt %, more preferably 0-0.05 wt % and most preferably 0 wt % of a trimerization catalyst TK. By the term "trimerization catalysts" herein are meant preferably tertiary amines and dibutytin dilaurate, which enable the catalysis of reactions leading to the formation of isocyanurates.

The trimerization catalyst TK is preferably selected from the list consisting of DMEA (dimethylethanolamine), TMBDA (tetramethylbutane-diamine), alkylamino ethers (e.g., bis(dimethylaminoethyl) ether), piperazines such as piperidine, tertiary alkylamines such as 3-dialkylaminopropionamide, TEA (triethylamine), N,N-dialkyl-3-(dialkylamino)propylamine, substituted morpholines such as N-acetamidopropylmorpholine, tris(dimethylamino)phenol and tris(dimethylaminomethyl)phenol, and dibutyltin dilaurate.

This is advantageous in that the composition does not cure too fast in the curing reaction and/or in that the composition does not overheat in the curing reaction.

In addition to those already mentioned, the composition may contain further constituents of the kind with which a person skilled in the art is familiar from polyurea compositions. These further constituents may be present in just one component or in both. As further constituents there may be present especially solvents, plasticizers and/or extenders, fillers such as especially carbon blacks, chalks or sheet-silicates, also pigments, rheology modifiers such as especially amorphous silicas, driers such as especially zeolites, adhesion promoters such as especially trialkoxysilanes, stabilizers against oxidation, heat, visible and UV radiation, flame retardants and also surfactants, especially wetting agents and defoamers.

The composition preferably contains no foam-generating substances or substances capable of foaming the reaction product.

The first and second components are each advantageously formulated such that their mixing ratio in parts by weight is in the range from 10:1 to 1:1, especially from 7.5:1 to 2:1. The mixing ratio between the two components is preferably such that, in the ready-mixed composition, the ratio between the number of isocyanate groups and the number of isocyanate-reactive groups is approximately in the range from 1.2 to 1, preferably from 1.15 to 1.05, before curing.

The two components are prepared separately from each other and preferably in the case of the second component K2 at least under exclusion of moisture. The two components are each typically stored in a separate container. The further constituents of the composition may be present as a constituent of the first component or of the second component, in which case isocyanate-reactive further constituents are preferably a constituent part of the first component. A suitable container for storing the particular component is especially a drum, a hobbock, a bag, a bucket, a can, a cartridge or a tube. The components are both storage-stable; that is, they can be kept before use for a period of several months up to a year or longer, without their changing in their respective properties to an extent that might be relevant to their in-service performance.

The two components are stored separately from each other before the step of mixing together the composition, and are only mixed together at the time of use or immediately beforehand. They are advantageously contained in one package that consists of two mutually separate compartments.

In a further aspect, the invention comprehends a package consisting of a container having two mutually separate compartments which respectively contain the first component of the composition and the second component of the composition.

The mixing step is typically effected via static mixers or by means of dynamic mixers. Care must be taken during the mixing step to ensure very homogeneous mixing of the two components. Incomplete mixing of the two components will result in local deviations from the advantageous mixing ratio, and this may come to be reflected in inferior adherence and inferior mechanical properties.

As the first component comes into contact with isocyanate groups of the second component, curing by chemical reaction ensues. The hydroxyl groups present and any further isocyanate-reactive substances react with isocyanate groups present. As a result of these reactions, the composition cures to form a solid material. This process is also referred to as crosslinking.

The present invention accordingly also provides a cured composition obtained from the curing process of the composition as described in the present document.

A further aspect of the present invention accordingly provides a method of adhesively bonding together substrates, wherein either or both, especially both, of the substrates comprise elastomeric material comprising unsaturated units, said method comprising a') mixing together a composition as described above,
b') coating a substrate S1 with the composition,
c') contacting that part of the substrate S1 which is coated with the composition with a substrate S2 such that the composition is positioned between the two substrates, and
d') curing the composition.

Alternatively, the substrate S2 may first be coated with the composition and then contacted with the substrate S1. Similarly, both the substrates S1 and S2 may be coated with the composition. Thereafter the adherend parts are joined together, whereafter the composition cures. Care must be taken here to ensure that the step of joining the parts take place within the so-called open time in order to ensure that the two adherend parts are reliably adhered together.

Either or both of the substrates S1 and S2 comprises an elastomeric material comprising unsaturated units. Preferably, both the substrates S1 and S2 comprise an elastomeric material comprising unsaturated units.

The substrate S2 may comprise the same material as S1 or a different material than S1. Preferably, S1 and S2 consist of the same material.

Preferably, the elastomeric material comprising unsaturated units comprises apolar, rubber-like material, especially selected from the group consisting of rubber, EPDM, NBR, SBR, SBS (styrene/butadiene/styrene triblock copolymer) and SIS (styrene/isoprene/styrene triblock copolymer), more preferably NBR, SBR and EPMD, most preferably NBR.

A further aspect of the present invention provides a method of patching defects, especially cracks or holes, in substrates, wherein the substrates comprise elastomeric material comprising unsaturated units, said method comprising a) mixing together a composition as described above,
b) introducing the composition into the defects, and
c) curing the composition.

"Defects" is to be understood as meaning one or more defects.

In the aforementioned methods, the substrates are preferably not pretreated before the step of applying the composition. Such pretreatments preferably do not comprise physical and/or chemical methods of cleaning, for example sanding, sandjetting, brushing or the like, or treating with chemical cleaning compositions, comprising instead physical or chemical procedures to enhance the adherence of the composition on the substrate, especially in its cleaned form. Such physical or chemical procedures are more particularly selected from the list consisting of chemical adhesion promoters, chemical oxidizing agents, especially chlorine-releasing oxidizing agents, and hydrogen peroxide-containing oxidizing agents, corona treatment, plasma treatment and flaming.

Pretreatments of this type are disadvantageous in that they constitute an additional, time-consuming operation, which causes a lot of expense, and the complexity and hence the error susceptibility of the method is increased. Preferably, in the aforementioned methods, the you chemical structure of the surface of the substrates is not pretreated before the step of applying the composition.

A further aspect of the present invention provides a composite structure obtainable by any one of the methods described above. The composite structure preferably comprises transportation belts, cushioning elements and tires, most preferably transportation belts, especially conveyor belts.

A further aspect of the present invention lastly provides the method of using a composition as described above for patching defects, especially cracks or holes, for coating or for adhesively bonding substrates, especially transportation belts, cushioning elements and tires, especially transportation belts, wherein the substrates comprise elastomeric material comprising unsaturated units. Regarding preferred substrates of this type, reference is made to the above remarks regarding the methods.

In a particularly preferred embodiment, the substrate mentioned comprises the constituent part of a conveyor belt, more preferably of a conveyor belt in the mining industry.

EXAMPLES

Substances Used:

TABLE 1

| | |
|---|---|
| Versalink P 650 (A1-1) | Oligomeric poly(tetramethylene oxide) di-p-aminobenzoate diamine, average molecular weight about 710-950 g/mol, amine number 120 mg KOH/g (Air Products and Chemicals, Inc., USA) |
| Versalink P 1000 (A1-2) | Oligomeric poly(tetramethylene oxide) di-p-aminobenzoate diamine, average molecular weight about 1238 g/mol, amine number 95 mg KOH/g (Air Products and Chemicals, Inc., USA) |
| Versalink 740 M | Trimethylene glycol di-p-aminobenzoate, average molecular weight about 314 g/mol, amine number 357 mg KOH/g (Air Products and Chemicals, Inc., USA) |
| Prepolymer-1 | The prepolymer-1 was prepared by reacting 1300 g of polyoxypropylene diol (Acclaim ® 4200 N, Bayer; OH number 28.5 mg KOH/g), 2600 g of polyoxypropylene-polyoxyethylene triol (Caradol ® |

TABLE 1-continued

| | |
|---|---|
| | MD34-02, Shell; OH number 35.0 mg KOH/g), 600 g of 4,4'-methylenediphenyl diisocyanate (Desmodur ® 44 MC L, Bayer) and 500 g of diisodecyl phthalate in the familiar manner at 80° C. to form an NCO-terminated polyurethane polymer having a free isocyanate group content of 2.05 wt %. |
| Ethacure 100 (PA) | Ethacure ® 100, mixture of mixtures of 3,5-diethyl-2,4- and -2,6-tolylenediamines, amine number 630 mg KOH/g, Bayer MaterialScience AG |
| Ancamine K54 (TK) | Ancamine K54 ®, 2,4,6-tri(dimethylaminomethyl)phenol, Air Products GmbH (Germany) |
| pTHFdiAmin 1300 (A2) | Poly(tetramethylene oxide)diamine, bis[(4-amino-butyl)poly(oxy-1,4-butanediyl)]amine, CAS No. 27417-83-0, average molecular weight about 1300 g/mol, amine number 103 mg KOH/g, (BASF, Germany) |
| pTHF 650 | Poly(tetramethylene oxide) diol, CAS No. 25190-06-1, average molecular weight about 625-675 g/mol, OH number about 165-180 mg KOH/g (BASF, Germany) |
| pTHF 1000 (A3) | Poly(tetramethylene oxide) diol, CAS No. 25190-06-1, average molecular weight about 975-1025 g/mol, OH number about 110-115 mg KOH/g (BASF, Germany) |
| Isonate M 143 (B1) | Modified diphenylmethane diisocyanate comprising MDI carbodiimide adducts, room temperature liquid, NCO content 29.4 wt % (Dow), NCO functionality about 2.2. |
| Desmodur VKS 20 (B1) | Mixture of diphenylmethane 4,4'-diisocyanate (MDI) with isomers and more highly functional homologs (PMDI), NCO content 31.5 wt % (Bayer MaterialScience AG), NCO functionality about 2.8. |
| Desmodur N3300 | Aliphatic polyisocyanate, hexamethylene 1,6-diisocyanate trimer (HDI trimer), NCO content 21.8 wt % (Bayer MaterialScience AG). |

Preparation of Polyurea Compositions

For compositions 1-64, the ingredients reported in tables 1, 3, 5 and 9 were taken in the reported amounts (in parts by weight) of the first component K1 and processed via a vacuum dissolver in the absence of moisture into a homogeneous paste for keeping. The ingredients reported in tables 1, 3, 5 and 9 for the second component K2 were processed for keeping in a similar way. Subsequently, the two components were processed via a SpeedMixer® (DAC 150 FV, Hauschild) during 30 seconds into a homogeneous paste, which was immediately tested as follows:

To determine its mechanical properties, the adhesive was made into a dumbbell shape as per ISO 527 Part 2, 1B, and stored at 23° C. for 24 h and then cured at 80° C. for 3 h. After a 24 h conditioning period at 23° C., the modulus of elasticity in the range from 0.05 to 0.25% extension ("E-modulus"), the tensile strength and the breaking extension of the test specimens thus obtained were measured as per ISO 527 on a Zwick Z020 tensile tester at the particular temperature reported in the table and an extension rate of 50 mm/min.

The gel time was determined as follows: 30 g of a ready-mixed composition were determined by the as-mixed mixture being introduced at room temperature into a thermally insulated vessel (made of Styropor), and being thoroughly stirred through manually with a spatula every 60 seconds. The time until it is no longer possible to move the spatula by hand without exerting considerable force is what is defined as the gel time.

The Tg values (glass transition temperatures) were determined by means of DMTA measurements on strip-shaped specimens (2-3 mm high, 2-3 mm wide, 8.5 mm long) stored at 23° C. for 24 h and then cured at 80° C. for 3 h, using a Mettler DMA/SDTA 861e instrument. The measurement conditions were: measurement in tension mode, 10 Hz excitation frequency and heating rate of 5 K/min. The specimens were cooled down to −60° C. and warmed to 200° C. to determine the complex modulus of elasticity E* [MPa], a maximum in the curve for the loss angle "tan δ" being read off as Tg value.

Figure 2:
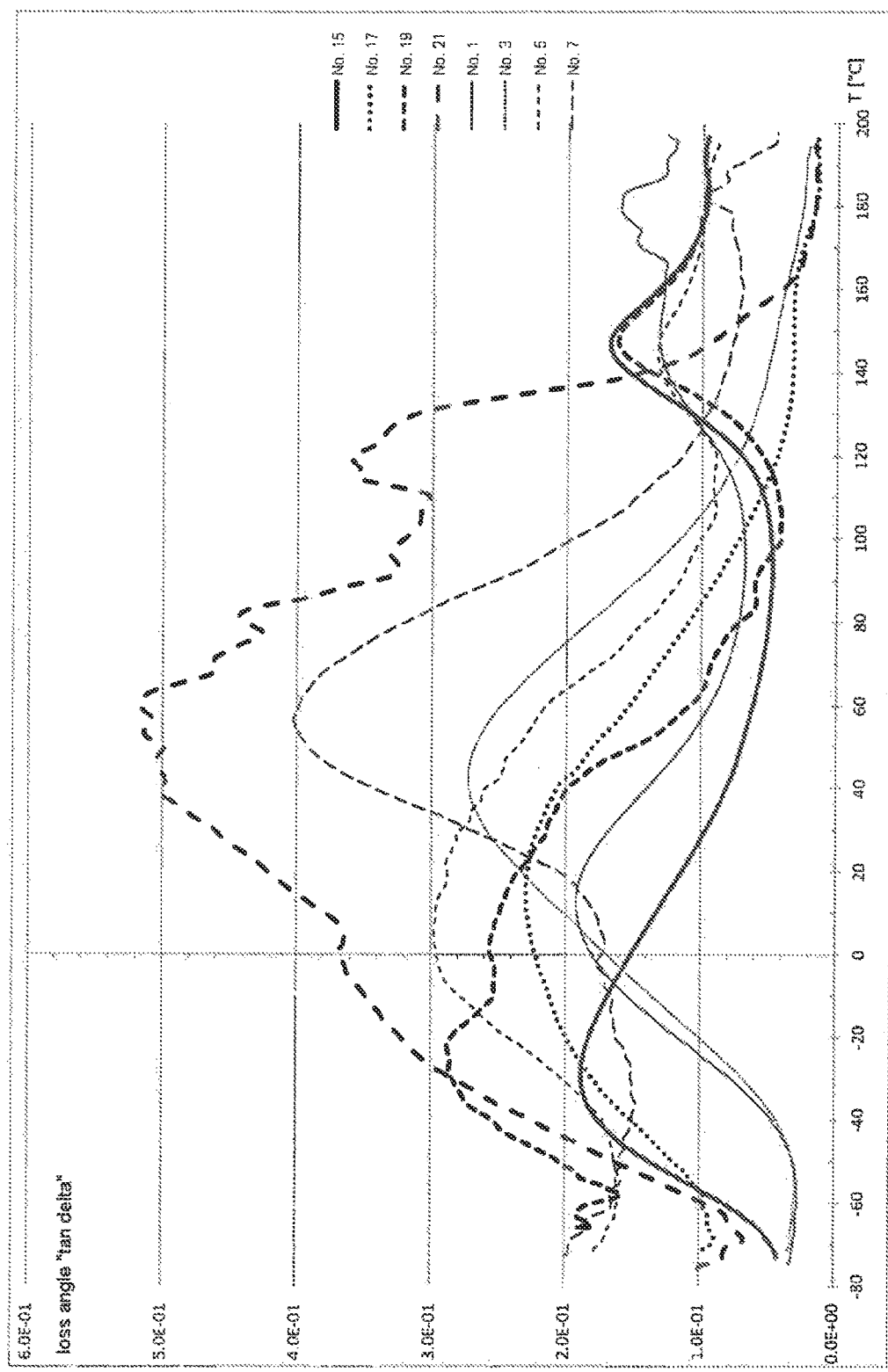

The results are reported in table 8 and FIGS. 1 and 2.

Table 2 lists the test specimens to be used, which had applied to them the corresponding composition. The composition was in each case cast into molds (1.3 cm wide/13 cm long/0.6 cm deep) firmly connected on the side to the test specimen using an adhesive tape, and left in the mold for 12 hours. Thereafter, the mold was removed and the specimens (beads) were cured at 23° C., 50% relative humidity for 7 days and subsequently tested.

The adherence of the adhesive was tested using the 'bead test'. The cured bead is incised at one end just above the adhesive-adherend interface. The incised end of the bead is gripped with a pair of round-nose pliers and pulled away from the adherend. This is done by carefully rolling up the bead on the tip of the pair of round-nose pliers, and also placing a cut all the way down to the blank adherend at right angles to the bead-pulling direction. The rate of bead pulling must be chosen such that a cut has to be made about every 3 seconds. The length of the test track has to be not less than 8 cm. Evaluation is according to the adhesive remaining behind on the adherend (in the event of cohesive failure) after the bead has been pulled off. Bonding properties are assessed by estimating the cohesive proportion of the bond area:

1=>95% cohesive failure

2=75-95% cohesive failure

3=25-75% cohesive failure

4=<25% cohesive failure

5=0% cohesive failure (purely adhesive failure)

The following test specimens were used:

TABLE 2

| | |
|---|---|
| EPDW | test specimen from EPDM, Semperit E9614, Rocholl GmbH, Germany |
| NBR | test specimen from NBR, NORA 301 color 5, machining 104, Rocholl GmbH, Germany |
| SBR | test specimen from SBR, NORA 302, machining 113, Rocholl GmbH, Germany |
| TPO Folie | TPO (thermoplastic polyolefins) sheet (40 mm/200 mm/1.5 mm), Sarnafil TS 77-15, Sika Schweiz |
| PVC hart | test specimen from rigid PVC, Kömadur ES, Rocholl GmbH, Germany |

Compositions 1 to 29, 57, 58 and 61-63 are examples in accordance with the present invention. The remaining compositions are comparative examples.

"MV 100 K1" in tables 3 and 5 and 9 is to be understood as meaning that the recited number of parts by weight of component K2 was used per 100 parts by weight of component K1. Components K1 and K2 are composed of the recited amounts (reported in parts by weight). Thus, for example, component K1 of composition 9 consists of 96.7 parts by weight of Versalink 650 and 3.3 parts by weight of pTHFdiAmin1300. Component K2 consists of 70 parts by weight of Isonate M143 and 30 parts by weight of Prepolymer-1. The two components were mixed in the weight ratio (K1:K2=100:44.3) using the SpeedMixer.

"NCO: Reakt" represents the molar ratio of NCO groups: NCO-reactive groups.

TABLE 3

| No. | MV 100 K1: | NCO:Reakt | Component K1 Versalink 650 | Versalink 1000 | pTHFdiAmin1300 | pTHF 1000 | Component K2 Isonate M143 | Desmodur VKS20 | Prepolymer-1 |
|---|---|---|---|---|---|---|---|---|---|
| 1 | 32 | 1.1 | 100 | | | | 100 | | |
| 2 | 44.5 | 1.1 | 100 | | | | 70 | | 30 |
| 3 | 30 | 1.1 | 100 | | | | | 100 | |
| 4 | 41.5 | 1.1 | 100 | | | | | 70 | 30 |
| 5 | 31.6 | 1.1 | 96.7 | | 3.3 | | 100 | | |
| 6 | 31.6 | 1.1 | 90 | | 10 | | 100 | | |
| 7 | 29.7 | 1.1 | 96.7 | | 3.3 | | | 100 | |
| 8 | 29.5 | 1.1 | 90 | | 10 | | | 100 | |
| 9 | 44.3 | 1.1 | 96.7 | | 3.3 | | 70 | | 30 |
| 10 | 44 | 1.1 | 93.3 | | 6.7 | | 70 | | 30 |
| 11 | 41.3 | 1.1 | 96.7 | | 3.3 | | | 70 | 30 |
| 12 | 41.1 | 1.1 | 93.3 | | 6.7 | | | 70 | 30 |
| 13 | 29 | 1.1 | 50 | 50 | | | 100 | | |
| 14 | 27 | 1.1 | 50 | 50 | | | | 100 | |
| 15 | 25 | 1.1 | | 100 | | | 100 | | |
| 16 | 35.2 | 1.1 | | 100 | | | 70 | | 30 |
| 17 | 24 | 1.1 | | 100 | | | | 100 | |
| 18 | 32.9 | 1.1 | | 100 | | | | 70 | 30 |
| 19 | 25.3 | 1.1 | | 96.7 | 3.3 | | 100 | | |
| 20 | 25.6 | 1.1 | | 90 | 10 | | 100 | | |
| 21 | 23.7 | 1.1 | | 96.7 | 3.3 | | | 100 | |
| 22 | 23.9 | 1.1 | | 90 | 10 | | | 100 | |
| 23 | 35.3 | 1.1 | | 96.7 | 3.3 | | 70 | | 30 |
| 24 | 35.4 | 1.1 | | 93.3 | 6.7 | | 70 | | 30 |
| 25 | 33 | 1.1 | | 96.7 | 3.3 | | | 70 | 30 |
| 26 | 33.1 | 1.1 | | 93.7 | 6.7 | | | 70 | 30 |
| 27 | 24 | 1.01:1.0 | 100 | | | | 100 | | |
| 28 | 27 | 1.05:1.0 | 70 | | | 30 | 100 | | |
| 29 | 26 | 1.05:1.0 | 95 | | | 5 | 100 | | |
| 30 | 27 | 1.1 | | | 100 | | 100 | | |
| 31 | 25.5 | 1.1 | | | 100 | | | 100 | |
| 32 | 22 | 0.92:1.0 | 100 | | | | 100 | | |

TABLE 4

| No. | tensile strength [MPa] | breaking extension [%] | E-modulus (0.5-5%) [MPa] | E-modulus (0.05-.25%) [MPa] | fracture energy [J/mm^2] | gel time [min] |
|---|---|---|---|---|---|---|
| 1 | 17.5 | 448 | 73 | 107 | 6.828 | 21 |
| 2 | 15.1 | 523 | 55.7 | 77.8 | 0.801 | 23 |
| 3 | 19.9 | 185 | 33 | 45.6 | 0.369 | 24 |
| 4 | 6.45 | 586 | 53.4 | 73.9 | 0.629 | 22 |
| 5 | 16.5 | 464 | 66 | 96.1 | 6.801 | 25 |
| 6 | 17 | 449 | 59.5 | 87.6 | 0.755 | 16 |
| 7 | 24 | 159 | 38.7 | 58.6 | 0.348 | 21 |
| 8 | 12.6 | 155 | 16.5 | 23.4 | 6.194 | 11 |
| 9 | 15.5 | 539 | 55 | 77.1 | 0.852 | 18 |
| 10 | 14.8 | 534 | 54.2 | 76.6 | 6.807 | 29 |
| 11 | 10.8 | 644 | 52.8 | 73.6 | 0.839 | 19 |
| 12 | 11.3 | 185 | 11 | 14.6 | 6.206 | 16 |
| 13 | 34.3 | 484 | 67.1 | 101 | 0.957 | 30 |
| 14 | 16.8 | 204 | 26.1 | 33.7 | 6.333 | 38 |
| 15 | 38.8 | 525 | 54.7 | 86.4 | 0.973 | 18 |
| 16 | 33.5 | 538 | 46.8 | 74.6 | 0.885 | 38 |
| 17 | 6.13 | 108 | 16.8 | 21.7 | 0.083 | 35 |
| 18 | 27.1 | 677 | 46.6 | 67.1 | 1.098 | 38 |
| 19 | 37.9 | 511 | 51.1 | 77 | 0.962 | 40 |
| 20 | 29.7 | 451 | 47.1 | 74.4 | 0.74 | 25 |
| 21 | 8.26 | 159 | 15 | 18.1 | 0.154 | 59 |
| 22 | 10.5 | 110 | 29 | 41 | 0.132 | 21 |
| 23 | 27.6 | 528 | 43.8 | 66.3 | 0.804 | 37 |
| 24 | 29.1 | 523 | 40.4 | 63.4 | 0.786 | 41 |
| 25 | 25.4 | 763 | 40.8 | 55 | 1.23 | 37 |
| 26 | 6.1 | 158 | 9.3 | 11.4 | 0.111 | 32 |
| 27 | 20.2 | 696 | 48 | 75 | 1.1 | 40 |
| 28 | 17.6 | 631 | 26 | 39 | 0.62 | 40 |
| 29 | 39.7 | 586 | 50.5 | 75 | 1.14 | 34 |
| 30 | n.b. | | | | | 0 |
| 31 | n.b. | | | | | 0 |
| 32 | 5.3 | 734 | 44 | 68 | 0.6 | 38 | n.b. = not determinable because the rapid and strongly exothermic reaction and the resulting severe inhomogeneity results in gelation and overheating of the reaction mass, preventing preparation of test specimens.

TABLE 5

| No. | MV 100 K1: | NCO:OH | Component K1 pTHF 650 | pTHF 1000 | pTHFdiAmin1300 | Component K2 Isonate M143 | Desmodur VKS20 | Prepolymer-1 |
|---|---|---|---|---|---|---|---|---|
| 33 | 45.8 | 1.1 | 100 | | | 100 | | |
| 34 | 42.8 | 1 1 | 100 | | | | 100 | |
| 35 | 63.6 | 1.1 | 100 | | | 70 | | 30 |
| 36 | 59.4 | 1.1 | 100 | | | | 70 | 30 |
| 37 | 45.2 | 1.1 | 96.7 | | 3.3 | 100 | | |

TABLE 5-continued

| | | Component K1 | | | Component K2 | | |
|---|---|---|---|---|---|---|---|
| No. | MV 100 K1: NCO:OH | pTHF 650 | pTHF 1000 | pTHFdiAmin1300 | Isonate M143 | Desmodur VKS20 | Prepolymer-1 |
| 38 | 42.2 1.1 | 96.7 | | 3.3 | | 100 | |
| 39 | 62.6 1.1 | 96.7 | | 3.3 | 70 | | 30 |
| 40 | 58.5 1.1 | 96.7 | | 3.3 | | 70 | 30 |
| 41 | 43.8 1.1 | 93.3 | | 6.7 | 100 | | |
| 42 | 40.9 1.1 | 93.3 | | 6.7 | | 100 | |
| 43 | 60.8 1.1 | 93.3 | | 6.7 | 70 | | 30 |
| 44 | 56.8 1.1 | 93.3 | | 6.7 | | 70 | 30 |
| 45 | 29.3 1.1 | | 100 | | 100 | | |
| 46 | 27.3 1.1 | | 100 | | | 100 | |
| 47 | 40.6 1.1 | | 100 | | 70 | | 30 |
| 48 | 37.9 1.1 | | 100 | | | 70 | 30 |
| 49 | 29.2 1.1 | | 96.7 | 3.3 | 100 | | |
| 50 | 27.2 1.1 | | 96.7 | 3.3 | | 100 | |
| 51 | 40.4 1.1 | | 96.7 | 3.3 | 70 | | 30 |
| 52 | 37.8 1.1 | | 96.7 | 3.3 | | 70 | 30 |
| 53 | 28.9 1.1 | | 93.3 | 6.7 | 100 | | |
| 54 | 27 1.1 | | 93.3 | 6.7 | | 100 | |
| 55 | 40.1 1.1 | | 93.3 | 6.7 | 70 | | 30 |
| 56 | 37.5 1.1 | | 93.3 | 6.7 | | 70 | 30 |

TABLE 6

| No. | tensile strength [MPa] | breaking extension [%] | E-modulus (0.5-5%) [MPa] | E-modulus (0.05-.25%) [MPa] | fracture energy [J/mm^2] | gel time [min] |
|---|---|---|---|---|---|---|
| 33 | 1.08 | 327 | 2.07 | 3.26 | 0.045 | 157 |
| 34 | 0.95 | 39 | 3 | 2.8 | 0.005 | 182 |
| 35 | 6.12 | 573 | 2.08 | 4 | 0.161 | 136 |
| 36 | 1.5 | 80 | 2.72 | 2.27 | 0.014 | 132 |
| 37 | 1.61 | 330 | 2.43 | 3.79 | 0.067 | 119 |
| 38 | 1.65 | 54 | 4.16 | 3.93 | 0.011 | 104 |
| 39 | 1.85 | 331 | 2.36 | 3.37 | 0.075 | 210 |
| 40 | 2.25 | 94 | 3.67 | 3.56 | 0.024 | 150 |
| 41 | 2.59 | 184 | 3.72 | 4 | 0.064 | 120 |
| 42 | 1.98 | 63 | 4.4 | 5.61 | 0.15 | 34 |
| 43 | 1.85 | 328 | 2.19 | 3.11 | 0.073 | 110 |
| 44 | 1.62 | 63 | 3.59 | 4 | 0.012 | 23 |
| 45 | 1.08 | 595 | 1.65 | 2.47 | 0.072 | 233 |
| 46 | 0.38 | 28 | 1.7 | 2.18 | 0.002 | 296 |
| 47 | 1.52 | 908 | 1.18 | 2.17 | 0.088 | 182 |
| 48 | 0.35 | 36 | 1.18 | 2.42 | 0.002 | 300 |
| 49 | 1.31 | 684 | 1.37 | 3.26 | 0.083 | 172 |
| 50 | 0.9 | 43 | 2.64 | 3.45 | 0.005 | 157 |
| 51 | 3.1 | 741 | 1.07 | 1.68 | 0.114 | 270 |
| 52 | 0.98 | 66 | 2.05 | 3.46 | 0.008 | 210 |
| 53 | 3.05 | 521 | 1.73 | 2.73 | 0.12 | 140 |
| 54 | 1.18 | 58 | 2.85 | 3.12 | 0.008 | 19 |
| 55 | 1.68 | 400 | 1.73 | 2.6 | 0.077 | 40 |
| 56 | 1.11 | 52 | 2.94 | 3.79 | 0.007 | 21 |

TABLE 7

| No. | 15 | 16 | 17 | 20 | 1 | 2 | 3 | 6 |
|---|---|---|---|---|---|---|---|---|
| NBR | 1 + | 4 + | 5 − | 1 + | 1 + | 4-5 + | 4-5 + | 4-5 + |
| SBR | 4 + | 4 + | 4-5 − | 4 + | 4 + | 4 + | 4-5 + | 4 + |
| EPDM | 4-5 + | 5 + | 5 + | 4-5 + | 5 + | 5 + | 5 + | 5 + |
| TPO | 5 | 5 | 5 | 5 | 5 | 5 | 5 | 5 |
| Folie | + | + | + | + | + | + | + | + |
| PVC hart | 5 + | 5 + | 5 + | 5 + | 5 + | 5 + | 5 + | 5 + |

Mechanical properties of bead:
+ = the bead does not rupture and the force is transferred to the adhesive-adherend interface
− = the bead is very "weak", ruptures very quickly and the force is not transferred to the adhesive-adherend interface

TABLE 8

| No. | TG1 [° C.] | TG2 [° C.] | TG3 [° C.] |
|---|---|---|---|
| 15 | −35 | 145 | 170 |
| 17 | −30 | 20 | 170 |
| 19 | −25 | 147 | 170 |
| 21 | −35 | 40 | 165 |
| 1 | 10 | 150 | — |
| 3 | 40 | 150 | — |
| 5 | 0 | 145 | 175 |
| 7 | 55 | 170 | — |

TABLE 9

| | | | Component K1 | | | Component K2 | |
|---|---|---|---|---|---|---|---|
| No. | MV 100 K1: | NCO:Reakt | Versalink 1000 | Ancamine K54 | Ethacure 100 | Isonate M143 | Desmodur N3300 |
| 57 | 25.4 | 1.05 | 30 | | | 7.6 | |
| 58 | 25.4 | 1.05 | 30 | 0.9 | | 7.6 | |
| 59 | 36.3 | 1.5 | 30 | | | 10.9 | |
| 60 | 23.0 | 0.95 | 30 | | | 6.9 | |
| 61 | 39.7 | 1.05 | 27 | | 3 | 11.9 | |
| 62 | 29.7 | 1.05 | 29.1 | 0.9 | | 8.9 | |

TABLE 9-continued

| | | | Component K1 | | | Component K2 | |
|---|---|---|---|---|---|---|---|
| No. | MV 100 K1: | NCO:Reakt | Versalink 1000 | Ancamine K54 | Ethacure 100 | Isonate M143 | Desmodur N3300 |
| 63 | 28.3 | 1.05 | 29.4 | | 0.6 | 8.5 | |
| 64 | 34.3 | 1.05 | 30 | | | | 10.3 |

TABLE 10

| No. | tensile strength [MPa] | breaking extension [%] | E-modulus (0.5-5%) [MPa] | E-modulus (0.05-.25%) [MPa] | fracture energy [J/mm^2] |
|---|---|---|---|---|---|
| 57 | 30.5 | 668 | 54 | 64 | 1.23 |
| 58 | n.b. | n.b. | n.b. | n.b. | n.b. |
| 59 | 31.4 | 400 | 67 | 136 | 0.84 |
| 60 | 14.3 | 1045 | 44 | 56 | 1.52 |
| 61 | n.b. | n.b. | n.b. | n.b. | n.b. |
| 62 | 27.5 | 539 | 41 | 36 | 1.16 |
| 63 | 32.5 | 541 | 41 | 48 | 1.11 |
| 64 | 2.4 | 113 | 3.35 | 7.34 | 0.03 | n.b. = not determinable because the rapid and strongly exothermic reaction and the resulting severe inhomogeneity results in gelation and overheating of the reaction mass, preventing preparation of test specimens.

Preparation of Further Polyurea Compositions 96.5 parts by weight of MS-23 were processed together with 3.5 parts by weight of Ethacure 100 for 30 seconds in a SpeedMixer® (DAC 150 FV, Hauschild) to form a homogeneous paste which was immediately tested as follows. Severe inhomogeneity results in local gelation and overheating of the reaction mass, preventing preparation of test specimens.

A first component K1 was prepared to consist of 100 parts by weight of Versalink P 1000 and 39 parts by weight of Ethacure 100. This first component K1 was processed in a weight ratio of K1:K2=100:65.6 with Isonate M 143 for seconds using a SpeedMixer® (DAC 150 FV, Hauschild). Severe inhomogeneity results in local gelation and overheating of the reaction mass, preventing preparation of test specimens.

A first component K1 was prepared to consist of 100 parts by weight of Versalink P 1000 and 69 parts by weight of Versalink 740M. This first component K1 was processed in a weight ratio of K1:K2=100:54 with Isonate M 143 for 30 seconds using a SpeedMixer® (DAC 150 FV, Hauschild). Severe inhomogeneity results in local gelation and overheating of the reaction mass, preventing preparation of test specimens.

Results:
DMTA Measurements

The compositions of the invention display a minimal change in the E-modulus across a wide temperature range.

Compositions comprising Versalink P 1000 (A1-2) have the first Tg at lower temperatures versus Versalink P 650 (A1-1). This is advantageous in that the advantageous mechanical properties found persist down to low temperatures and/or remain relatively constant. They further lead to a distinct temperature interval ranging from −20° C. to 40° C., preferably from −20° C. to 50° C., between two successive Tgs, which is advantageous in relation to unchanging mechanical properties, since there are many technical applications, especially for conveyor belts, particularly in the mining industry, which fall within this temperature range.

Compositions comprising Isonate M143 versus Desmodur VKS20 have two discrete Tgs instead of one mixed Tg, and/or the temperature interval between the individual Tgs is greater, which is conducive to unchanging mechanical properties, especially across a larger temperature range.

Adherence Measurements

The compositions of the invention were surprisingly found to display adherence to rubber only, but not to TPO or rigid PVC.

The compositions all display their best adherence to NBR, their second best adherence to SBR and their third best adherence to EPDM.

Compositions comprising Isonate M143 instead of Desmodur VKS20 display superior adherence to all rubber substrates.

Compositions comprising Versalink P1000 A1-2 only instead of Versalink P650 A1-2 only display superior adherence to EPDM.

What is claimed is:

1. A method comprising treating a substrate comprising an elastomeric material having unsaturated units with a curable composition, said treating selected from the group consisting of patching a defect in the substrate, coating the substrate, and adhesively bonding the substrate to another substrate, and said composition comprising at least, a first component and a second component, wherein
the first component K1 comprises
one or more than one di(aminobenzoate) ester A1 of formula (I)

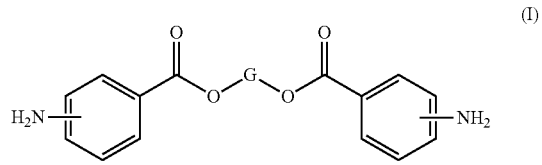

with an average molecular weight of 500 g/mol to 2000 g/mol, where G is a divalent moiety deriving from poly(tetramethylene oxide) diol, and
the second component K2 comprises
one or more than one aromatic polyisocyanate B1 with an average molecular weight of 160 g/mol to 1100 g/mol, wherein the molar ratio between the isocyanate groups of the second component K2 and the isocyanate-reactive groups of the first component K1 is in the range from 1.3 to 1.0.

2. The method as claimed in claim 1, wherein the polyisocyanate B1 has an NCO functionality of 2.0-4.

3. The method as claimed in claim 1, wherein the aromatic polyisocyanate B1 comprises MDI and/or TDI.

4. The method as claimed in claim 1, wherein the aromatic polyisocyanate B1 comprises carbodiimides or uretoneimines or urethanes of these polyisocyanates.

5. The method as claimed in claim 1, wherein the second component contains 60 to 100 wt % of the aromatic polyisocyanate B1.

6. The method as claimed in claim 1, wherein the aromatic polyisocyanate B1 comprises 95-100 mol % of all the isocyanate groups of the second component K2.

7. The method as claimed in claim 1, wherein the second component K2 further contains at least one isocyanate-functional polyurethane polymer B2.

8. The method as claimed in claim 1, wherein the di(aminobenzoate) ester A1 comprises a compound of formula (II)

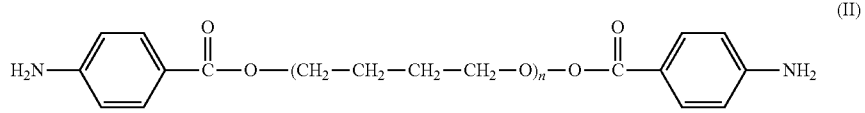

(II)

where n is 9-14.

9. The method as claimed in claim 1, wherein the di(aminobenzoate) ester A1 comprises a mixture of di(aminobenzoate) esters A1-1 having an average molecular weight of 700-1000 g/mol and di(aminobenzoate) esters A1-2 having an average molecular weight of 1100-1300 g/mol, wherein the mole ratio of A1-1/A1-2 is from 0.01-100.

10. The method as claimed in claim 1, wherein the first component K1 further comprises an aliphatic polyetherdiamine A2 with an average molecular weight of 900 g/mol to 2100 g/mol, wherein the polyetherdiamine A2 comprises from 1-15 mole percent of the isocyanate-reactive groups of the first component K1.

11. The method as claimed in claim 1, wherein the first component K1 further comprises an aliphatic polyetherdiol A3 with an average molecular weight of 600 g/mol to 1200 g/mol, wherein the polyetherdiol A3 represents 1-40 mole percent of the isocyanate-reactive groups of the first component K1.

12. The method as claimed in claim 1, comprising patching a defect in the substrate and curing the composition.

13. The method as claimed in claim 1, comprising coating the substrate and curing the composition.

14. The method as claimed in claim 1, comprising adhesively bonding the substrate to another substrate and curing the composition.

15. The method as claimed in claim 1, wherein the elastomeric material comprising unsaturated units comprises a polar, rubber-like material selected from the group consisting of rubber, EPDM, NBR, SBR, SBS and SIS.

16. The method as claimed in claim 1, wherein the substrate is a transportation belt, a cushioning element or a tire.

17. The method as claimed in claim 1, wherein the composition contains from 0 to less than 3 wt % of an aromatic polyamine having a molecular weight in the range of 60 to 500 g/mol.

18. The method as claimed in claim 17, wherein the aromatic polyamine is selected from the group consisting of m-phenylenediamine, p-phenylenediamine, 4,4'-, 2,4'- and/or 2,2'-diaminodiphenylmethane, 3,3'-dichloro-4,4'-diaminodiphenylmethane (MOCA), 2,4- and/or 2,6-tolylenediamine, mixtures of 3,5-dimethylthio-2,4- and -2,6-tolylenediamine, mixtures of 3,5-diethyl-2,4- and -2,6-tolylenediamine (DETDA), 3,3',5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5'-dimethyl-4,4'-diaminodiphenylmethane (M-MIPA), 3,3',5,5'-tetraisopropyl-4,4'-diaminodiphenylmethane (M-DIPA), 4,4'-diaminodiphenyl sulfone (DDS), 4-amino-N-(4-aminophenyl)benzene-sulfonamide, 5,5'-methylenedianthranilic acid, dimethyl (5,5'-methylenedianthranilate), 1,3-propylene-bis(4-aminobenzoate), 1,4-butylene-bis(4-aminobenzoate), 1,2-bis(2-aminophenyl-thio)ethane, and 2-methylpropyl 4-chloro-3,5-diaminobenzoate and tert-butyl 4-chloro-3,5-diaminobenzoate.

19. The method as claimed in claim 17, wherein the composition contains 0-1 wt % of the aromatic polyamine.

20. The method as claimed in claim 17, wherein the composition contains no aromatic polyamine.

* * * * *